(No Model.)
R. H. HASSLER.
ELECTRIC CONVERTER.
No. 531,996. Patented Jan. 1, 1895.
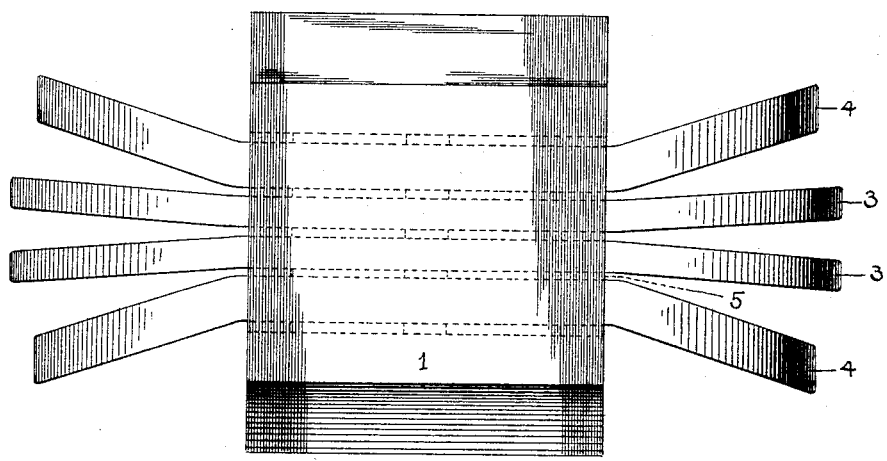
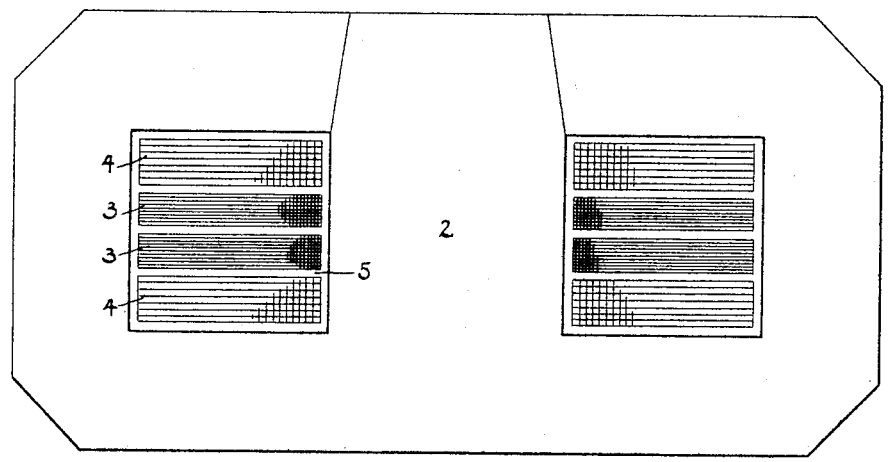
WITNESSES:
George Brown Jr
H. C. Ferner
INVENTOR,
Robert H. Hassler
BY Terry and MacKay
ATTORNEYS.

UNITED STATES PATENT OFFICE.

ROBERT H. HASSLER, OF PITTSBURG, PENNSYLVANIA, ASSIGNOR TO THE WESTINGHOUSE ELECTRIC AND MANUFACTURING COMPANY, OF SAME PLACE.

ELECTRIC CONVERTER.

SPECIFICATION forming part of Letters Patent No. 531,996, dated January 1, 1895.

Application filed April 30, 1894. Serial No. 509,527. (No model.)

*To all whom it may concern:*

Be it known that I, ROBERT H. HASSLER, a citizen of the United States, residing at Pittsburg, in the county of Allegheny and State of Pennsylvania, have invented a new and useful Improvement in Electric Converters, (Case No. 595,) of which the following is a specification.

My invention relates to converters for producing change of potential in alternating current systems of distribution.

It is well known that where alternating currents are transformed in a converter, both the iron and the copper of the converter are heated by the action of the current, and the amount of heat liberated in this manner depends upon the proportions of the various parts, upon the amount of current flowing, the frequency of alternations, and also upon the shape of the core and coils with relation to facility of ventilation, conduction and radiation.

The object of my invention is the production of a form of converter wherein an especially good insulation will be produced and wherein the cooling of the coils may be easily accomplished by ventilation.

My invention is illustrated in the accompanying drawings, wherein—

Figure 1 is a top view of the converter showing the spreading apart of the projecting sides of the coils; and Fig. 2 is a section through my converter showing the coils in section and one of the plates forming the converter in plan.

In the drawings, the core of my converter is shown at 1, and is built up as usual of plates of suitable shape 2, which may be formed in many well known ways. Indeed the shape of the core has little or nothing to do with the invention herein set forth; but my invention is particularly useful with cores which provide closed magnetic circuits, inasmuch as these generally require extra precautions for ventilation.

In the practice of my invention, the primary coils and the secondary coils are each divided up into a number of parts, two parts being shown in the drawings, wherein the primary coils are shown at 3 and the secondaries at 4.

It is evident, of course, that the various parts or subdivisions of either the primary or the secondary may be connected in multiple arc or in series, according to the potential changes desired. As shown in the drawings, each section of coil is separately insulated and is separated from the coil and insulation next it by air spaces 5. These air spaces are necessarily restricted within the body of the core, but the projecting portions whether sides or ends of the coils 3 and 4, I prefer to spread apart in a radiating or fan-like position, such as is plainly indicated in Fig. 1. This insures an enlargement of the air spaces 5, thus creating increased ventilation, and furthermore provides for a more complete insulation of the primary from the secondary in that part of the coils which projects from the core.

My invention is not concerned with the form of coils or core beyond the provision of coils which diverge where they project from the core. The kind of conductors used, their connections, number, &c., are immaterial, as well as is the shape of the core itself, and all these details may be varied without departing from the spirit of my invention.

It is evident that my invention is applicable to self-induction or choking coils, as well as to converters proper, inasmuch as the projecting ends of the coil or coils in such a self induction device may be spread apart for purposes of ventilation in the same manner as is shown in Fig. 1.

What I claim is—

1. A magnetic core and coils surrounding the same, said coils having projecting portions arranged in a radiating position for the provision of increased air space, substantially as described.

2. In a converter, a core and coils wound thereon, said coils having projecting ends arranged in a fan-like form, substantially as described.

3. In a converter, a core and separately wound and insulated coils thereon, said coils having projecting ends, which are spread or arranged fan-wise, substantially as described.

4. In a converter, the core and separately wound insulated coils thereon, said coils being separated by air spaces and spread in a radiating direction in those portions which project from the core, substantially as described.

In testimony whereof I have hereunto subscribed my name this 25th day of April, A. D. 1894.

ROBERT H. HASSLER.

Witnesses:
JAMES W. SMITH,
HAROLD S. MACKAYE.